(12) United States Patent
Simone, Jr. et al.

(10) Patent No.: US 10,237,303 B2
(45) Date of Patent: Mar. 19, 2019

(54) PREVALENCE-BASED REPUTATIONS

(71) Applicant: McAfee, LLC, Plano, TX (US)

(72) Inventors: Kenneth D. Simone, Jr., Allen, TX (US); Paul A. Whitehurst, Frisco, TX (US); Mark Joseph Boudreaux, Allex, TX (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/913,437

(22) PCT Filed: Dec. 20, 2013

(86) PCT No.: PCT/US2013/077149
§ 371 (c)(1),
(2) Date: Feb. 22, 2016

(87) PCT Pub. No.: WO2015/047441
PCT Pub. Date: Apr. 2, 2015

(65) Prior Publication Data
US 2016/0212173 A1 Jul. 21, 2016

Related U.S. Application Data

(60) Provisional application No. 61/884,117, filed on Sep. 29, 2013.

(51) Int. Cl.
*H04L 29/06* (2006.01)
(52) U.S. Cl.
CPC ............ *H04L 63/20* (2013.01); *H04L 63/145* (2013.01)

(58) Field of Classification Search
CPC ... H04L 63/20; H04L 63/1433; H04L 63/105; G06F 21/577; G06F 17/30864; G06F 21/56; G06F 17/3053
See application file for complete search history.

(56) References Cited

U.S. PATENT DOCUMENTS

| | | | |
|---|---|---|---|
| 5,987,610 A | 11/1999 | Franczek et al. |
| 6,073,142 A | 6/2000 | Geiger et al. |
| 6,460,050 B1 | 10/2002 | Pace et al. |
| 6,775,661 B1 † | 8/2004 | Redner |
| 7,506,155 B1 | 3/2009 | Stewart et al. |

(Continued)

FOREIGN PATENT DOCUMENTS

| | | |
|---|---|---|
| CN | 102656587 B | 6/2016 |
| WO | WO 2015047441 | 4/2015 |

OTHER PUBLICATIONS

International Preliminary Search Report on Patentability and Written Opinion in International Application PCT/US2013/077149 dated Mar. 29, 2016.

(Continued)

*Primary Examiner* — Christopher C Harris
(74) *Attorney, Agent, or Firm* — Patent Capital Group

(57) ABSTRACT

In an example, there is disclosed a method and system for calculating an object's trust level for security purposes based on prevalence in a context-aware network. In an embodiment, as objects are accessed, a client queries a domain master such as a reputation server to evaluate the object's reputation. The domain master may maintain a prevalence-based reputation database, which may be updated as new clients report object prevalences.

21 Claims, 15 Drawing Sheets

(56) References Cited

U.S. PATENT DOCUMENTS

| | | | |
|---|---|---|---|
| 8,225,406 B1 | 7/2012 | Nachenberg | |
| 8,402,545 B1* | 3/2013 | Chen | G06F 21/56 |
| | | | 726/24 |
| 8,510,836 B1 | 8/2013 | Nachenberg | |
| 8,572,007 B1* | 10/2013 | Manadhata | G06F 21/56 |
| | | | 706/12 |
| 8,671,449 B1* | 3/2014 | Nachenberg | G06F 21/56 |
| | | | 713/187 |
| 8,732,587 B2* | 5/2014 | Narayanan | G06F 21/64 |
| | | | 715/745 |
| 8,769,702 B2* | 7/2014 | Hulten | G06F 21/51 |
| | | | 379/68 |
| 9,065,849 B1* | 6/2015 | Rivera | H04L 63/1433 |
| 9,223,978 B2* | 12/2015 | Kraemer | G06F 21/552 |
| 2005/0108418 A1* | 5/2005 | Bedi | G06F 17/30902 |
| | | | 709/232 |
| 2006/0047666 A1* | 3/2006 | Bedi | G06F 17/3089 |
| 2006/0167897 A1* | 7/2006 | Jones | G06F 9/542 |
| 2006/0277280 A1* | 12/2006 | Craggs | H04L 51/26 |
| | | | 709/220 |
| 2008/0082662 A1* | 4/2008 | Dandliker | H04L 63/10 |
| | | | 709/225 |
| 2008/0248801 A1* | 10/2008 | Fletcher | H04W 4/02 |
| | | | 455/435.2 |
| 2011/0040825 A1† | 2/2011 | Ramzan et al. | |
| 2011/0113105 A1 | 5/2011 | Eckardt | |
| 2011/0125821 A1* | 5/2011 | Roshen | G06F 9/546 |
| | | | 709/201 |
| 2011/0258268 A1* | 10/2011 | Banks | G06Q 10/06 |
| | | | 709/206 |
| 2012/0066346 A1* | 3/2012 | Virmani | G06F 21/552 |
| | | | 709/219 |
| 2013/0254880 A1 | 9/2013 | Alperovitch et al. | |
| 2014/0143825 A1† | 5/2014 | Behrendt et al. | |

OTHER PUBLICATIONS

International Search Report and Written Opinion in International Application PCT/US2013/077149 dated Jun. 25, 2014.

Chinese Office Action in Chinese Patent Application No. 201380079251.7 date May 3, 2018, 9 pages with Summary of Relevance.

\* cited by examiner
† cited by third party

PREVALENCE-BASED REPUTATIONS

CROSS-REFERENCE TO RELATED APPLICATIONS

This application claims priority to U.S. Provisional Application 61/884,117, entitled "Calculation of Trust Level Based on Prevalence in Local Network," filed 29 Sep. 2013, which is incorporated herein by reference.

FIELD OF THE DISCLOSURE

This application relates to the field of enterprise security, and more particularly to determining prevalence-based reputations on a data exchange layer.

BACKGROUND

An enterprise service bus (ESB) is a software-based network architecture that provides a medium of data exchange over a service-oriented architecture. In some embodiments, ESB is a special case of a client-server software architecture in which clients may route messages through the server.

Software, binaries, executables, advertising, web pages, documents, macros, executable objects, and other data provided to users (collectively "executable objects") may include security flaws and privacy leaks that are subject to exploitation by malware. As used throughout this specification, malicious software ("malware") may include a virus, Trojan, zombie, rootkit, backdoor, worm, spyware, adware, ransomware, dialer, payload, malicious browser helper object, cookie, logger, or similar application or part of an application designed to take a potentially-unwanted action, including by way of non-limiting example data destruction, covert data collection, covert communication, browser hijacking, network proxy hijacking or redirection, covert tracking, data logging, keylogging, excessive or deliberate barriers to removal, contact harvesting, unwanted use of premium services, and unauthorized self-propagation. In some cases, malware may also include legitimate software that includes inadvertent security flaws that cause or enable malware behavior. "Malware behavior" is defined as any behavior that qualifies an application as malware or grayware. Some prior art systems are configured to identify and block malware, for example by maintaining databases of known malware.

In addition to executable objects, computing devices may encounter static objects, which are not intended to change the operating state of a computer. As a class, executable objects and static objects may be referred to simply as "objects." An enterprise security concern is the classification of objects' malware status.

BRIEF DESCRIPTION OF THE DRAWINGS

The present disclosure is best understood from the following detailed description when read with the accompanying FIGUREs. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION OF THE EMBODIMENTS

Overview

Figure 1:
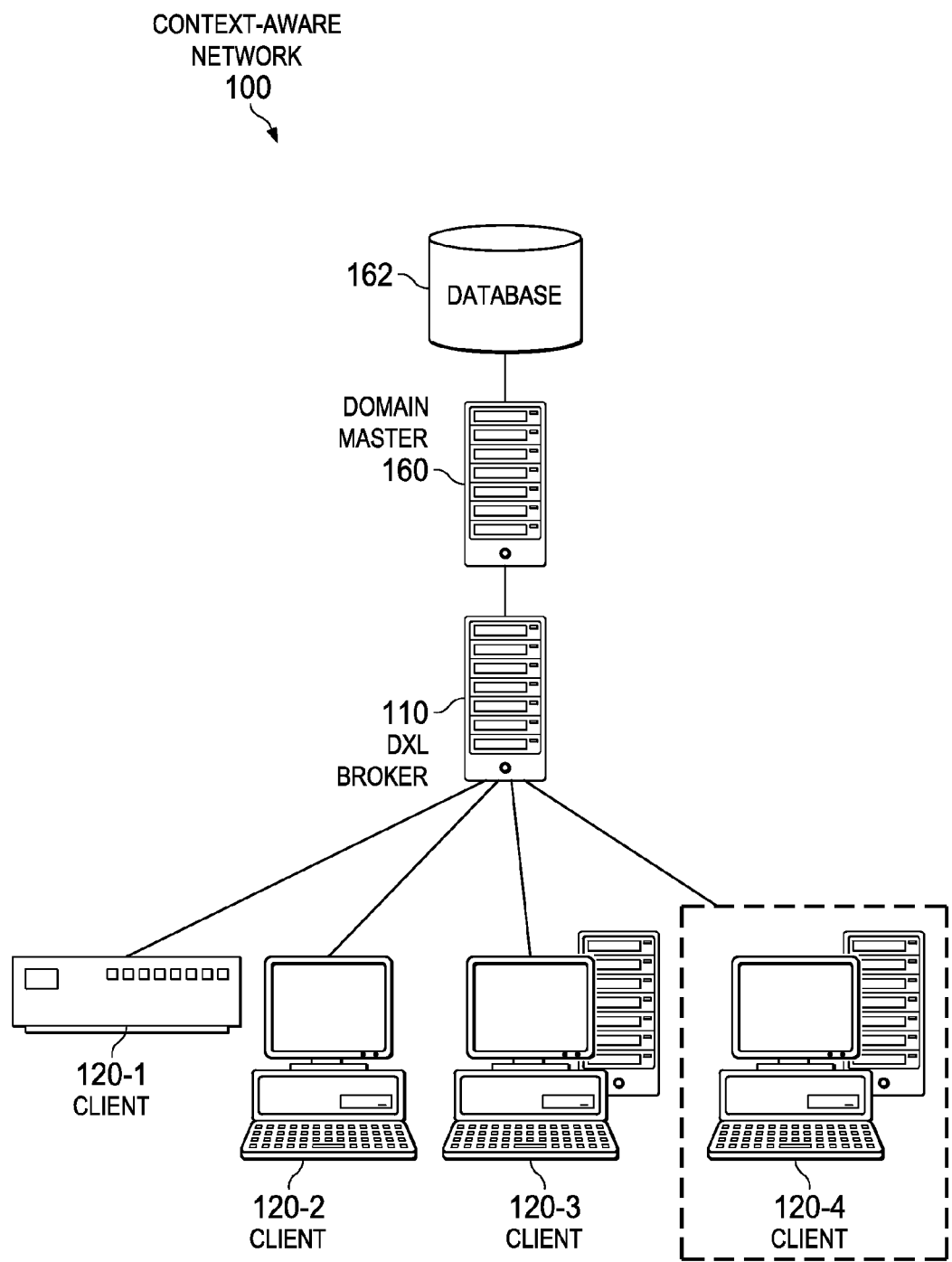
FIG. 1 is a network diagram of a context-aware network with DXL capability according to one or more examples of the present specification.

In an example, there is disclosed a method and system for calculating an object's trust level for security purposes based on prevalence in a context-aware network. In an embodiment, as objects are accessed, a client queries a domain master such as a reputation server to evaluate the object's reputation. The domain master may maintain a prevalence-based reputation database, which may be updated as new clients report object prevalences.

Examples of the Disclosure

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed.

Different embodiments may have different advantages, and no particular advantage is necessarily required of any embodiment.

In an increasingly heterogeneous software ecosystem, enterprises may face new and enhanced security challenges and malware threats. This creates a situation in which real-time exchange of threat intelligence between otherwise autonomous network elements is desirable. Increased sharing may improve security between devices that otherwise operate in their own security "silos."

The system and method of the present specification addresses such challenges by providing standardized data representations across data sources, and safeguarding the quality of data shared by disparate sources.

Context-Aware Computing (CAC) is a style of computing in which situational and environmental information about people, places and things is used to anticipate immediate needs and proactively offer enriched, situation-aware, and usable functions and experiences. Context-aware computing relies on capturing data about the world as it is at the moment the system is running.

According to one or more examples of the present specification, a "context-aware network" is an adaptive system, including for example a security system, of interconnected services that communicate and share information to make real-time, accurate decisions by individual products and/or as a collective. According to an example, network, endpoint, database, application and other security solutions are no longer to operate as separate "silos" but as one synchronized, real-time, context-aware and adaptive, security system.

In an example, multiple network elements are connected to one another via a data exchange layer (DXL), which is a type of ESB that is suitable for exchange of security-related messages among other things. As used herein, "network elements" include any type of client or server (e.g., a video server, a web server, etc.), routers, switches, gateways, bridges, load-balancers, firewalls, inline service nodes, proxies, network appliances, processors, modules, or any other suitable device, component, element, or object operable to exchange information in a network environment. More specifically, DXL endpoints are network elements that interact over a DXL ESB. DXL endpoints may be distributed across a customer network and communicate in "real-time" in a trusted, secure, and reliable fashion. This may provide increased automation and improved security services.

In an example, DXL endpoints are deployed at strategic locations within a network to intercept ongoing business activity, inspect and interpret it, and ultimately determine whether it is authorized, meaning for example that it is consistent with enterprise security policies. In some cases, network elements make such decisions "in-band," momentarily suspending the business activity, and in "machine-real-time," at latencies low enough to avoid a significant user-perceptible delay in the business activity.

In some cases, network elements may have independent access to security data only by way of their own independent analysis and observation, and via scheduled definition updates, which may come, for example, on a weekly basis as updated malware definitions.

Because network elements are often heterogeneous and may be deployed, particularly in a modern network, in a temporary or ad hoc fashion, real-time intelligence becomes a challenge, particularly when "in-band" decisions are necessary. Furthermore, an enterprise may procure security solutions in a piecemeal fashion, so that one product cannot always assume the presence of another product. For example, there may not be a single, pre-defined repository of threat intelligence for network elements to consult, and regular malware definition updates may not include lately discovered threats. Representation and interpretation of data offer yet another challenge. Network elements may use disparate, proprietary data representations. Thus, for example, even an antivirus scanner may not be configured to share newly-discovered malware information with a network-based security device. Trustworthiness of information may be yet another challenge in other contexts. In other words, even if an antivirus scanner and network-based security device are configured to share security intelligence, each may not have a means of validating intelligence received from the other.

In an example, the present specification provides a data exchange layer (DXL), which may operate on a lightweight messaging-based communications infrastructure such as ESB and be configured to allow endpoints to share contextual data. DXL may be one element of a larger security-connected framework, which is an adaptive system, such as a security system, of interconnected services that communicate and share information to make real-time, accurate security decisions by individual security products and/or as a collective. According to an example, network, endpoint, database, application and other security solutions need not operate as separate 'silos' but as one synchronized, real-time, context-aware and adaptive security system.

In an example of a security-connected framework, a real-time, bi-directional communications fabric is provided for enabling real-time security management. Specifically, certain existing messaging infrastructures are based on one-to-many communications (publish-subscribe). The publish-subscribe capabilities may be significantly enhanced, so that communication can be one-to-one (for example, peer-to-peer), or bi-directional (for example, query-response). Advantageously, the framework can scale to millions of concurrent connected clients, so that any connected client can reach any other connected client in real-time or near real-time regardless of the physical location of the connected clients. To this end, the DXL abstraction layer is provided between different types of connected clients, and acts as an intermediary communications medium.

A DXL domain master may combine and reconcile the client properties received from a plurality of sources into a single record of truth according to a common information model (CIM), containing a single value or values. This may include determining that a first data source is more trusted than a second data source, and using the data from the first data source, or otherwise reconciling a plurality of data into a single record.

The reconciled data may be stored in a domain database, and a domain master may publish the client properties on the DXL. A DXL broker may then forward the published message to DXL endpoints, which receives a singular and most accurate reconciled value. Subsequently, a client may send a DXL request over the DXL, inquiring about the properties of a DXL client. The DXL broker receives this request and automatically routes it to a domain master. The domain master retrieves the client properties from its domain database and sends a DXL response message, which the DXL broker receives and forwards to the DXL client. Note that while the "publish-subscribe" transactions in this example are one-to-many, one-to-one "request-response" transactions are natively provided on the same fabric.

Further adding to extensibility, new or better data sources may be incorporated, by integrating them with domain master 160. This may be completely transparent to clients 120 and other DXL endpoints.

Additional features of a DXL broker may include, by way of non-limiting example: service and location registries to lookup registered endpoints, available services, and their locations; publish/subscribe (1:N), request/response (1:1), device-to-device (1:1), and push notification messaging interfaces; optimized message passing between brokers; destination-aware message routing; and broker-to-broker failover.

Advantageously, domain masters need not be concerned with how each DXL endpoint treats a published message. Rather, that can be a matter of enterprise security policy.

FIG. 1 is a network diagram of a context-aware network 100 with DXL capability. According to this example, a plurality of clients 120 are connected to a DXL enterprise service bus (ESB) 130. DXL ESB 130 is an example of a DXL fabric, and may be provided on top of an existing network, such as a local area network (LAN). Client 120 may be any suitable computing device, including by way of non-limiting example a computer, a personal digital assistant (PDA), a laptop or electronic notebook, a cellular telephone, an IP telephone, an iPhone™, an iPad™, a Microsoft Surface™, an Android™ phone, a Google Nexus™, or any other device, component, element, or object capable of initiating voice, audio, or data exchanges within a communication system, including a suitable interface to an end user, such as a microphone, a display, or a keyboard or other terminal equipment. In the example of FIG. 1, client 120-1 is an embedded device, such as a network security sensor. Client 120-2 is a virtual machine. Client 120-3 is a laptop or notebook computer. Client 120-4 is a desktop computer.

DXL ESB 130 may be any type of physical or virtual network connection over which appropriate data may pass. At present, there is no fixed or global standard for an ESB, and the term, as used herein, is intended broadly to encompass any network technology or topology suitable for message exchange. In one embodiment, message queuing telemetry transport (MQTT) messages are exchanged on port 8883. In some cases, clients 120, DXL broker 110, domain master 160, database 162, joint threat intelligence KO server (FIG. 1A), proxy 170 (FIG. 1A), and threat intelligence service 180 (FIG. 1A), all by way of non-limiting example, may be referred to as "network elements."

Network elements configured to operate on or with DXL ESB 130 may be referred to as "DXL endpoints." These may include, in an example, clients 120, DXL broker 110, and domain master 160.

DXL broker 110 may be configured to provide DXL messaging services over DXL ESB 130, such as maintaining DXL routing tables and delivering messages.

DXL broker 110 provides DXL services 190, which in an example are network services operable to provide DXL ESB 130 to DXL endpoints.

Domain master 160 may be configured to communicatively couple to DXL broker 130. Domain master 160 may maintain domain data in a database such as database 162. In this example, domain master 160 and database 162 are shown as two distinct entities, but it should be noted that many configurations are possible. For example, database 162 may reside on a disk drive local to the domain master 160, or may be separately or remotely hosted. Database 162 is disclosed by way of example, and may be any suitable data store, including a structured or relational database, distributed database, or flat file by way of non-limiting example.

By way of operative example, a client such as laptop 120-3 connects to the LAN and receives a new IP address. At this point, several properties of laptop 120-3 become knowable to other network elements, including, by way of non-limiting example, its IP address, information about its operating system, and the logged-on user's username. For ease of reference, these are referred to as "client properties" throughout this example. Client properties are embodiments of security-intelligence data, and are of interest to virtual machine 120-2, which has previously subscribed the security-intelligence data topic with domain master 160.

Client properties may be reported to the DXL simultaneously by two distinct sources, namely by laptop 120-3, and by network security sensor 120-1. However, network security sensor 120-1 may fail to report a username value. It may also report an OS value different from that reported by the laptop 120-3. This may be, for example, because network security sensor 120-1 is sensing data remotely, and may not be able to determine these values as reliably as laptop 120-3 itself.

Domain master 160 is responsible for the "client system" data domain, which includes client properties. When laptop 120-3 and client 120-1 publish a message containing the client properties, both messages are first routed to DXL broker 110. DXL broker 110 may then forward the client properties to domain master 160.

Domain master 160 may combine and reconcile the client properties received from the two sources into a single record of truth, containing a single value for IP address, operating system, and username respectively. Specifically, it may determine via its own logic and perhaps prior configuration that laptop 120-3 is trusted more for OS value than network security sensor 120-1. Therefore, domain master 160 may ignore the "operating system" value received from network security sensor 120-1 when it conflicts with laptop 120-3.

The reconciled client properties are persistently stored in domain database 162. Domain master 160 may then publish the client properties on DXL ESB 130. DXL broker 110 may then forward the published message to virtual machine 120-2, which receives a singular and most accurate value for client properties.

Subsequently, client 120-4 may send a DXL request over DXL ESB 130, inquiring about the client properties for laptop 120-3. DXL broker 110 receives this request and automatically routes it to domain master 160. Domain master 160 retrieves the client properties from domain database 162 and sends a DXL response message, which DXL broker 110 receives and forwards to client 120-4. Note that while the "publish-subscribe" transactions in this example are one-to-many, the "request-response" transactions are one-to-one.

In some embodiments, DXL may be characterized by messaging that allows loose integration or coupling of multiple network elements. Loose coupling may reduce the assumptions each DXL endpoint must make about other DXL endpoints, such as the presence of certain capabilities, hardware, or software. According to one or more examples of the present specification, DXL is a 'Plug-and-Play' application program interface (API), and may facilitate context-aware and adaptive security by enabling context to be shared between products.

Further according to one or more examples of the present specification, DXL is an elastic architecture with multiple deployment options and is highly scalable. DXL may also be designed with openness in mind and enable third-party integration.

DXL ESB 130 may be based on a two-layer protocol. The "bottom" layer is a secure, reliable, low-latency data transport fabric that connects diverse security elements as a mesh, or in a hub-and-spoke configuration. The "top" layer is an extensible data exchange framework that is configured to facilitate trustworthy data representation.

In an example, DXL endpoints connect to DXL ESB 130. Each DXL endpoint is assigned a distinct identity, and authenticates itself to DXL ESB 130 upon startup, for example via a certificate or other secure token. DXL endpoints may establish one-to-one communications via DXL ESB 130, for example by sending a DXL message addressed to a DXL endpoint with a specific identity. This enables DXL endpoints to communicate with each other without having to establish a point-to-point network connection. In an example, this is analogous to a person-to-person phone call.

In another example, DXL may provide a publish-subscribe framework in which certain DXL endpoints "subscribe" to messages of a certain type. When a DXL endpoint "publishes" a message of that type on DXL ESB 130, all subscribers may process the message, while non-subscribers may safely ignore it. In an example, this is analogous to a podcast subscription service. In yet another example, DXL may provide a request-response framework. In this case, one DXL endpoint may publish a request over DXL ESB 130. An appropriate DXL endpoint receiving the request may provide a response. Advantageously, the response may be used by more than just the DXL endpoint that originally published the request. For example, if a client 120 publishes a request for an object's reputation, JTI server 150 may respond by publishing the reputation. Thus, other clients 120 that find instances of the object may benefit from the response. For example, clients 120 may maintain a comprehensive cache of reputations published on the network. If a client 120 then newly encounters an object that is known on the network, client 120 already has an up-to-date reputation for the object.

DXL ESB 130 may be implemented using diverse software elements, patterns, and constructs suited to the specific infrastructure connecting the security elements. For instance, in a physical enterprise network, messaging middleware consisting of multiple interconnected message brokers may be deployed, where endpoints connect to the closest broker. In a virtual network infrastructure, the fabric may leverage hypervisor provided channels.

As noted above, DXL ESB 130 may be configured to provide real-time, trusted exchange of data among otherwise-autonomous, dynamically-assembled DXL endpoints. Thus, in an example DXL ESB 130's conceptual framework may comprise two virtual components:

a. Broad collections of security-relevant data are categorized into "data domains." Each data domain is a closely related sub-collection of entities, attributes, and inter-relationships.

b. Domain master 160 is a data provider assigned ownership of data for each domain. Domain master 160 acts as an intermediate trusted data broker between first-hand sources of raw "intelligence" data, and data consumer endpoints such as clients 120. Intelligence data may flow from data producer endpoints to the appropriate domain master 160, and then be relayed to data consumer endpoints such as clients 120. Note that in this example, the concepts of "data producer" and "data consumer" are contextual roles, and not necessarily physical devices. A client 120 may be a data producer in one context and a data consumer in another context.

In an example, domain master 160 may establish first-hand trust relationships with data-provider endpoints. This enables it to gauge the quality (including accuracy and reliability) of data (such as reputation data) it receives from any particular source. When duplicate, piecemeal data is received from multiple (independent) sources, such as different clients 120, domain master 160 may reconcile the data and resolve conflicts to derive a single best-known record of truth (such as, for example, a reputation) for each object. This ensures that clients 120 receive consistent data.

Domain master 160 may also transform data into a well-understood, standardized representation. This representation may be published on DXL ESB 130, so that all clients 120 receive usable data.

Advantageously, DXL endpoints do not need to know what device originated data, or make point-to-point connections to other DXL endpoints, even when one-to-one communication is necessary. Rather, DXL client software or DXL extensions enable a DXL endpoint to use its own local APIs for querying and receiving data. To increase network efficiency, DXL endpoints may cache received data locally, which data may be trusted until it is superseded by an authorized DXL message. For example, clients 120 may subscribe to published reputations for objects. When an object reputation is received, either in response to a request-response transaction, or in a publish-subscribe model, client 120 may store the reputation in a local database. The reputation may be trusted until superseded, because DXL master 160 is configured to publish a reputation update whenever it receives an updated reputation. Thus, frequent individual data requests from clients 120 become bulk data subscriptions, as published reputations are available to all clients 120 that subscribe to reputations. Advantageously, this may reduce the latency of data exchanges.

In yet another example, DXL broker 110 provides a discovery and location service that informs DXL endpoints of the specific domain master 160 to which data query and subscription requests should be routed.

Advantageously, the example DXL architecture described herein is flexible. For example, individual data sources may connect and disconnect from the network without affecting data consumers. Domain master 160 may simply rely on whatever data sources are available. Furthermore, the framework makes no assumptions about the physical location or specifically how domain master 160 or domain endpoints are deployed or configured. So long as each network element provides valid DXL messaging, traffic is routed correctly.

In the example above, DXL master 160 is a logical singleton, but it should be noted that DXL master 160 may be implemented, for example, as a set of distributed service components, where each component services either a subset of the domain, or provides a local data replica of a service running elsewhere. Such configurations may enhance scale, performance, and reliability. This may also allow services to be transparently relocated.

Further advantageously, the DXL framework provided herein is extensible. For example, data about new entities and relationships may be provided simply by creating new data domains. New attributes and relationships for existing data domains may be provided simply by defining new message types for that domain.

In an example, domain master 160 has responsibility over the domain of malware data. To distinguish messages from the "malware" domain, such as network status and device maintenance, a namespace may be defined for each. For example, the reputation domain may use the "MALWARE" namespace, the network status domain may use the "STATUS" namespace, and the device maintenance domain may use the "MAINT" namespace. Thus, if domain master 160 is the master for the reputation domain, it knows to process messages within the malware namespace, and to ignore all others. This allows a designer for each domain to assign a set of messages without having to consult existing domains to avoid name collisions for messages.

For example, both the reputation domain and a device maintenance domain may have use for a message such as DOWNLOAD_UPDATES. In the case of the reputation domain, this message may be an instruction to retrieve updated definitions from JTI server 150. In the device maintenance domain, this may be an instruction to download operating system updates from a vendor.

Clients 120 may be configured to exchange data from several DXL domains and may subscribe to messages on both the reputation domain and the device maintenance domain. Thus, client 120-1 for example, may be configured to parse and respond to a DXL message DOWNLOAD_UPDATES by requesting bulk reputation updates. In one embodiment, the message requesting malware updates may itself be a DXL message. In some cases, for example when updates are large and are not needed in real-time, delivery of the updates may be completed outside of the DXL architecture to reserve a DXL for lightweight, high-speed messaging.

Client 120 may also know that it should parse and respond to MAINT: DOWNLOAD_UPDATES by contacting a vendor's servers and requesting updates.

In the case where domain master 160 is configured as the master for the reputation domain, it may know to ignore all DXL messages that are not in the MALWARE namespace. Note, however, that a single physical device may be configured to act as a domain master for multiple domains, in which case traffic in different namespaces may be passed to different subroutines. In some embodiments, DXL broker 110 may be configured to synthesize reports from a plurality of DXL network devices such as clients 120 that are given lesser privileges, such as "suggest" privileges on DXL ESB 130.

Further adding to extensibility, new or better data sources may be incorporated, by integrating them with domain master 160. This may be completely transparent to clients 120 and other DXL endpoints.

Additional features of a DXL broker 110 may include, by way of non-limiting example: service and location registries to lookup registered endpoints, available services, and their locations; publish/subscribe (1:N), request/response (1:1), device-to-device (1:1), and push notification messaging interfaces; optimized message passing between brokers; destination-aware message routing; and broker-to-broker failover.

Advantageously, domain master 160 need not be concerned with how each DXL endpoint treats a published message. Rather, that can be a matter of enterprise security policy.

Additional DXL features for clients 120 may include, by way of non-limiting example: local message bus integration of an API to discover brokers, authenticate to DXL, and send and receive catalogued messages.

Additional general features of context-aware network 100 may include, by way of non-limiting example: DXL broker and client provisioning and management of domain master 160; policy-based authorization of endpoints onto DXL ESB 130; secure SSL-based communications; proxy support for off-premises communications; and domain master appliances pre-configured with DXL broker functionality (thus joining domain master 160 and DXL broker 110 into one device).

Figure 1A:
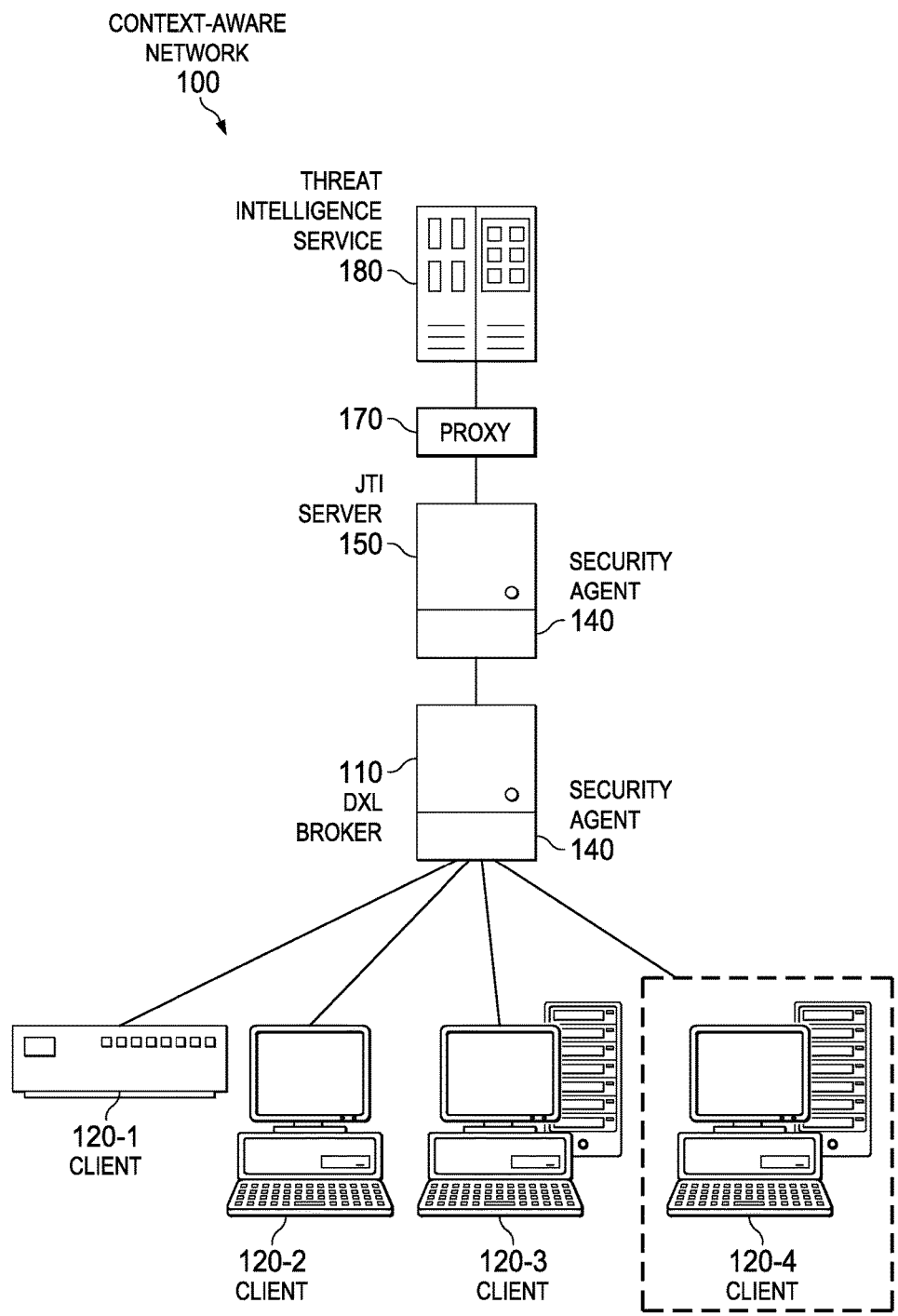
FIG. 1A is an example where a domain master is a joint threat intelligence (JTI) server according to one or more examples of the present specification.

FIG. 1A is an example where domain master 160 is a joint threat intelligence (JTI) server 150, providing for example, object reputation services on the "reputation" domain according to one or more examples of the present specification. JTI server 150 may communicatively couple to DXL broker 110. JTI server 150 may be a middleware appliance configured to provide reputation services, maintain metadata about network objects (such as reputation, prevalence, and intelligence, by way of non-limiting example), call out to external scanners for an object's reputation classification, and provide telemetry data to threat intelligence service 180. JTI server 150 may communicate with a global threat intelligence service 180 via a proxy 170, which may include either communication over DXL ESB 130, or over a more traditional IP network.

Advantageously, JTI server 150, in connection with threat intelligence service 180, may provide crowd-sourced object reputations. JTI server 150 may also provide administrator overrides. These may include aggregation of administrator override policies, from several enterprises, for whether an object should be run on a network and whether a certificate is considered "clean." These may also include client-side results, such as an aggregate of end-user decisions of whether to allow or block an object.

In another example, JTI server 150 may track prevalence data, including the prevalence of an object on context-aware network 100.

In yet another example, JTI server 150 may serve as a telemetry aggregator/proxy to gather and send to threat intelligence service 180 telemetry from endpoints that do not directly interact with threat intelligence service 180. JTI server 150 may also contribute file metadata to threat intelligence service 180, such as hashes, digital signature data, and file attributes.

JTI server 150 may receive several such messages from different clients 120, and in some cases, the messages may conflict with one another. Upon receiving an initial report from a client 120 identifying an object as malware, domain master 160 may publish a warning that the other clients should give additional scrutiny to the object, such as deep scanning or requesting user verification before executing the object. In other embodiments, domain master 160 may provide such information in response to a request for an object reputation from a client 120.

If additional clients 120 identify the object as malware, then a confidence indicator may pass a threshold. JTI server 150 may then publish a higher-level, such as commandlevel, message identifying the object as malware. If JTI server 150 receives multiple conflicting reports from different clients, a synthesis algorithm may provide an appropriate action. For example, if one or a few clients are found to be outliers, reporting a status different from a large majority of other clients, the outliers may be discarded. This synthesis algorithm may also account for specific clients' past reputations for accurate reporting, or for a reputation assigned based on installed hardware or software.

In an example where domain master 160 is a JTI server 150, this example illustrates the value of designating a hierarchy or other schema for assigning DXL endpoint privileges. For example, with respect to designating an object as malware, clients 120 may have "suggest" privileges. This may mean, for example, that clients 120 may identify an object that they believe to be malware, and may either direct a specific message to JTI server 150, or may publish a general message identifying the object as malware. Because clients have only "suggest" privileges on DXL ESB 130, other DXL endpoints that subscribe to reputation updates may treat the identification as less authoritative than an identification from a DXL network element with elevated privileges such as "assign" privileges. Privileges, and especially elevated privileges such as "assign" privileges, may be authenticated by a secure certificate provided as part of a DXL message.

Figure 1B:
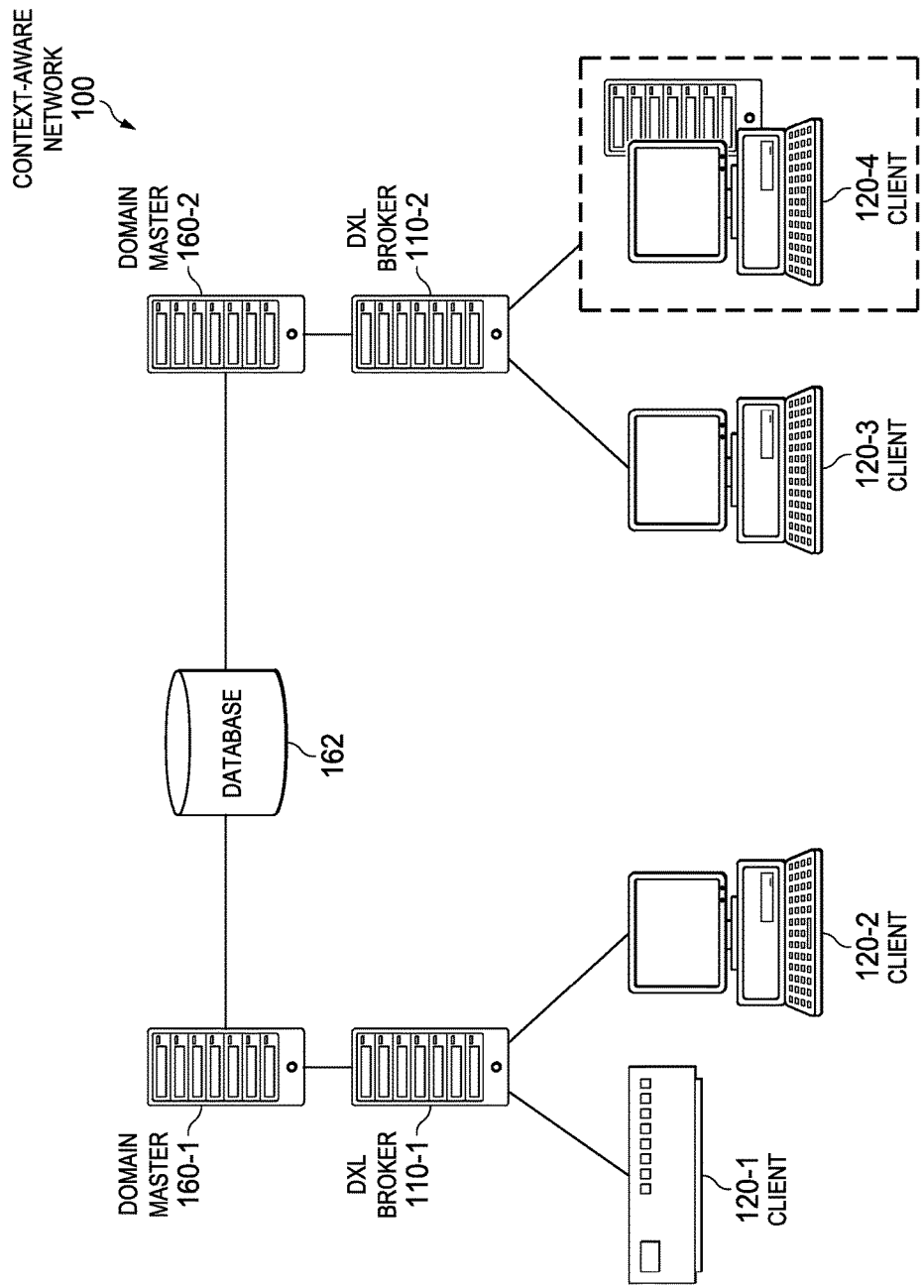
FIG. 1B is a network diagram of select elements and a context-aware network according to one or more examples of the present specification.

FIG. 1B is a network diagram of select elements and a context-aware network 100 according to one or more examples of the present specification. As seen in FIG. 1B, an additional DXL broker 110-2 may be added to service endpoints 120-3 and 120-4. DXL broker 110-2 may communicate with a second domain master 160-2, which may share domain database 162 with domain master 160-1.

Figure 2:
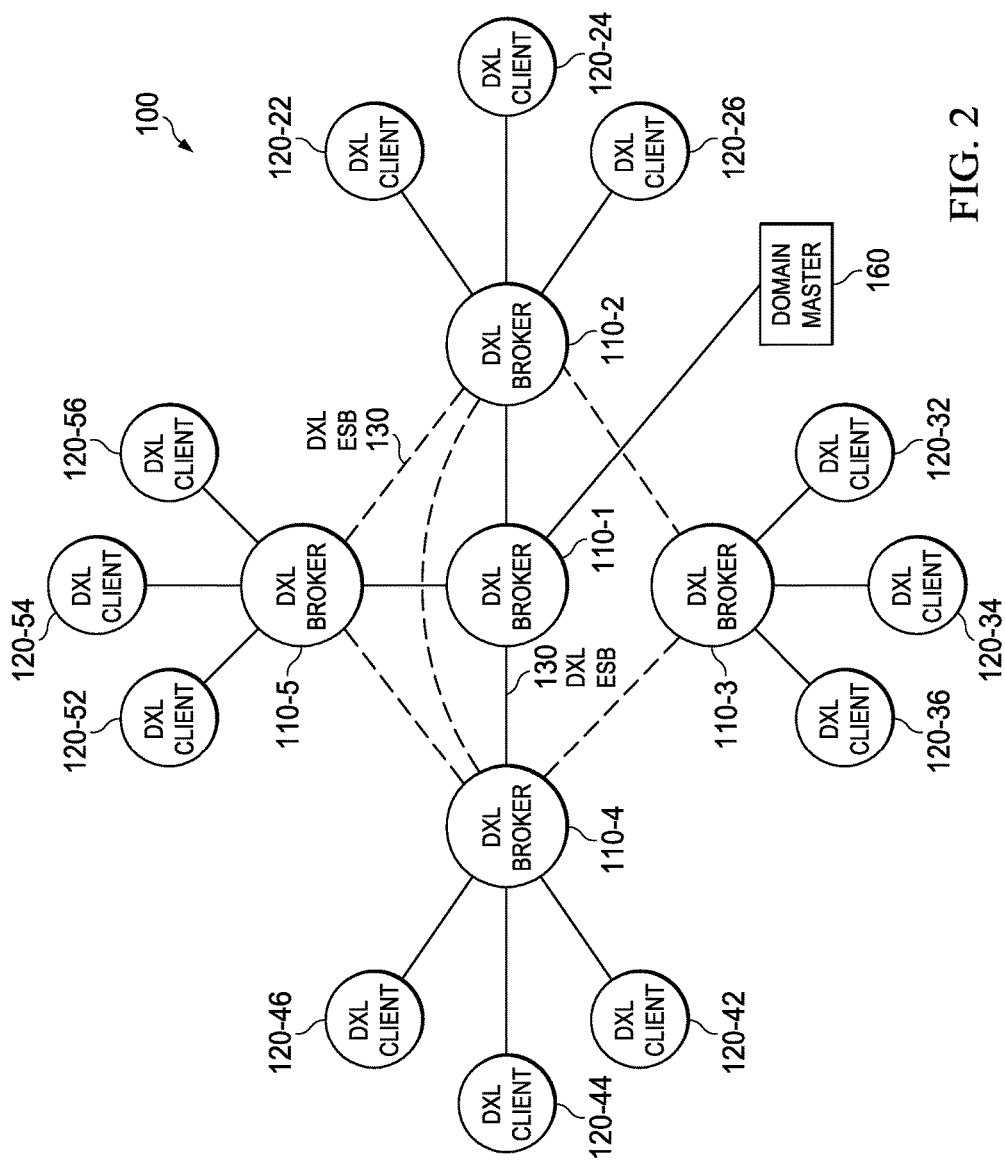
FIG. 2 is a network diagram disclosing a distributed architecture according to one or more examples of the present specification.

FIG. 2 is a network diagram disclosing a distributed architecture according to one or more examples of the present specification. In this example, DXL broker 110-1 may be designated as the "hub," while DXL brokers 110-2, 110-3, 110-4, and 110-5 may be designated as "spokes." In an example, all DXL traffic that passes through a spoke will be forwarded to the hub, which will distribute the traffic to other spokes. Designation of a DXL broker 110 as the hub may be accomplished via any suitable means, such as selecting the hub based on MAC ID, IP address, or network proximity to domain master 160.

If DXL broker 110-1 goes offline, another hub may be at least temporarily needed. In that case, another hub may be elected. When DXL broker 110-1 comes back online, it may resume its duties as a hub, or may act as a spoke, depending on network topology and design considerations.

In another example, spokes may form a temporary mesh network upon effectively connecting to DXL broker 110-1. In yet other embodiments, DXL brokers 110 may be configured to operate full time in a mesh configuration.

Figure 3:
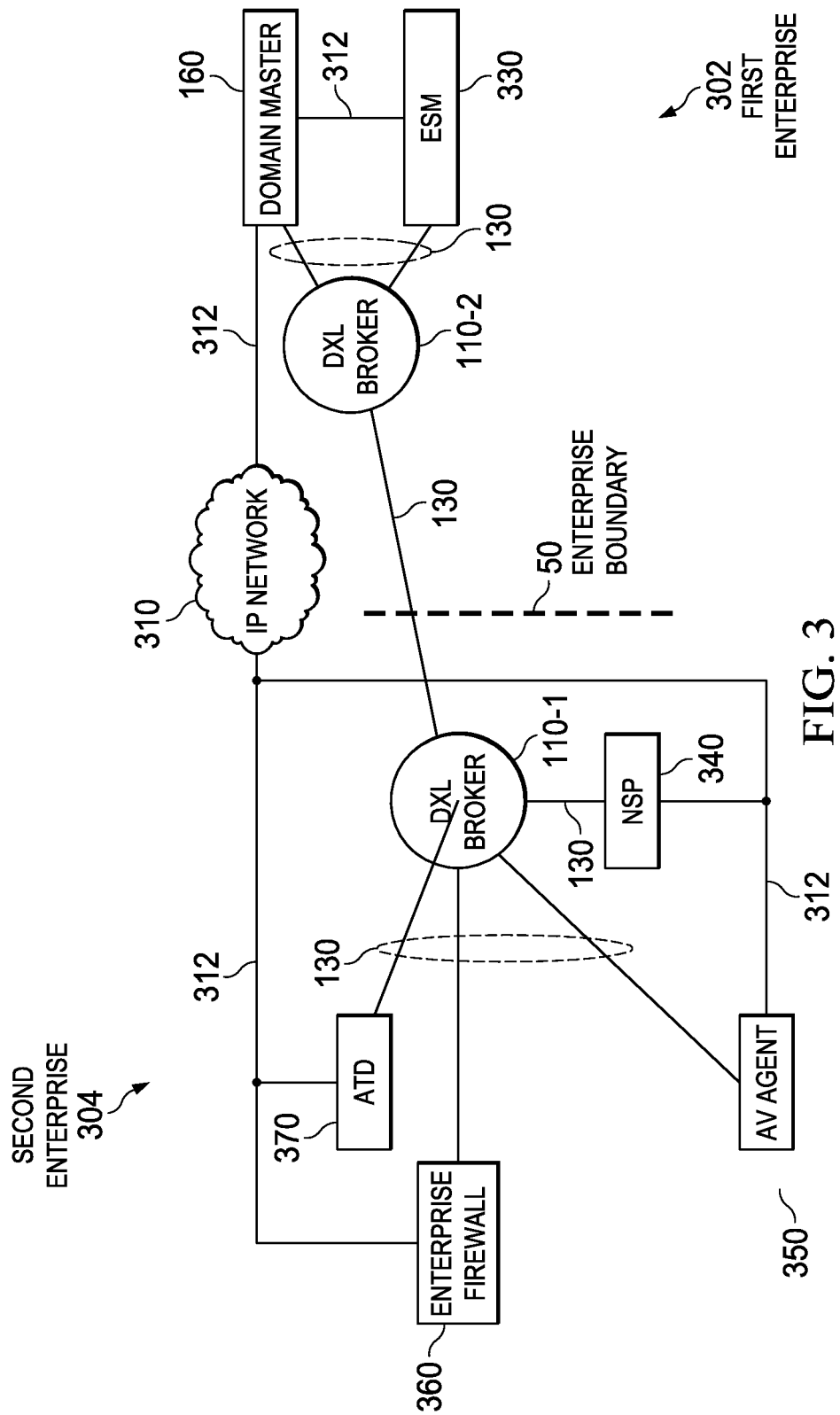
FIG. 3 is a network diagram of an example DXL network operating across a traditional enterprise boundary according to one or more examples of the present specification.

Additional extensibility may be provided by bridging DXL ESB 130 across disparate networks, enabling data to be exchanged over larger networks, including the Internet. FIG. 3 is a network diagram of an example DXL network operating across a traditional enterprise boundary according to one or more examples of the present specification. In this example, first enterprise 302 includes a DXL broker 110-2 which communicatively couples to a domain master 160 and enterprise switch master (ESM) 330. In one embodiment, domain master 160 and ESM 330 may be coupled over a traditional (non-DXL) network interface 312. Domain master 160 may connect to an IP network 310. IP network 310 may be any communicative platform operable to exchange data or information emanating from endpoints, including by way of non-limiting example, an Internet architecture providing end users with the ability to electronically interact, a plain old telephone system (POTS), which end users could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Second enterprise 304 also includes a DXL broker 110-1. DXL brokers 110 may communicate with each other over DXL ESB 130. In this example, DXL ESB 130 is physically provided by IP Network 310, but DXL traffic may be distinguished from other types of Internet traffic such as http and other user-centric network traffic, for example because it is provided on a different port or protocol.

DXL broker 110-1 may also be coupled, for example, to a network service provider (NSP) 340, antivirus agent 350, enterprise firewall 360, and advanced threat detection appliance (ATD) 370.

ATD 370 may be a dedicated appliance, or a general-purpose computing machine running advanced detection software. In one example, ATD 370 is configured to analyze objects without existing reputations and to assign those objects threat levels based on the analysis.

As this figure demonstrates, DXL ESB 130 may be used to integrate heterogeneous or otherwise unrelated network architectures, even across different enterprises. In an example, second enterprise 304 may be a third-party JTI service provider delivering ATD services to first enterprise 302.

Figure 4:
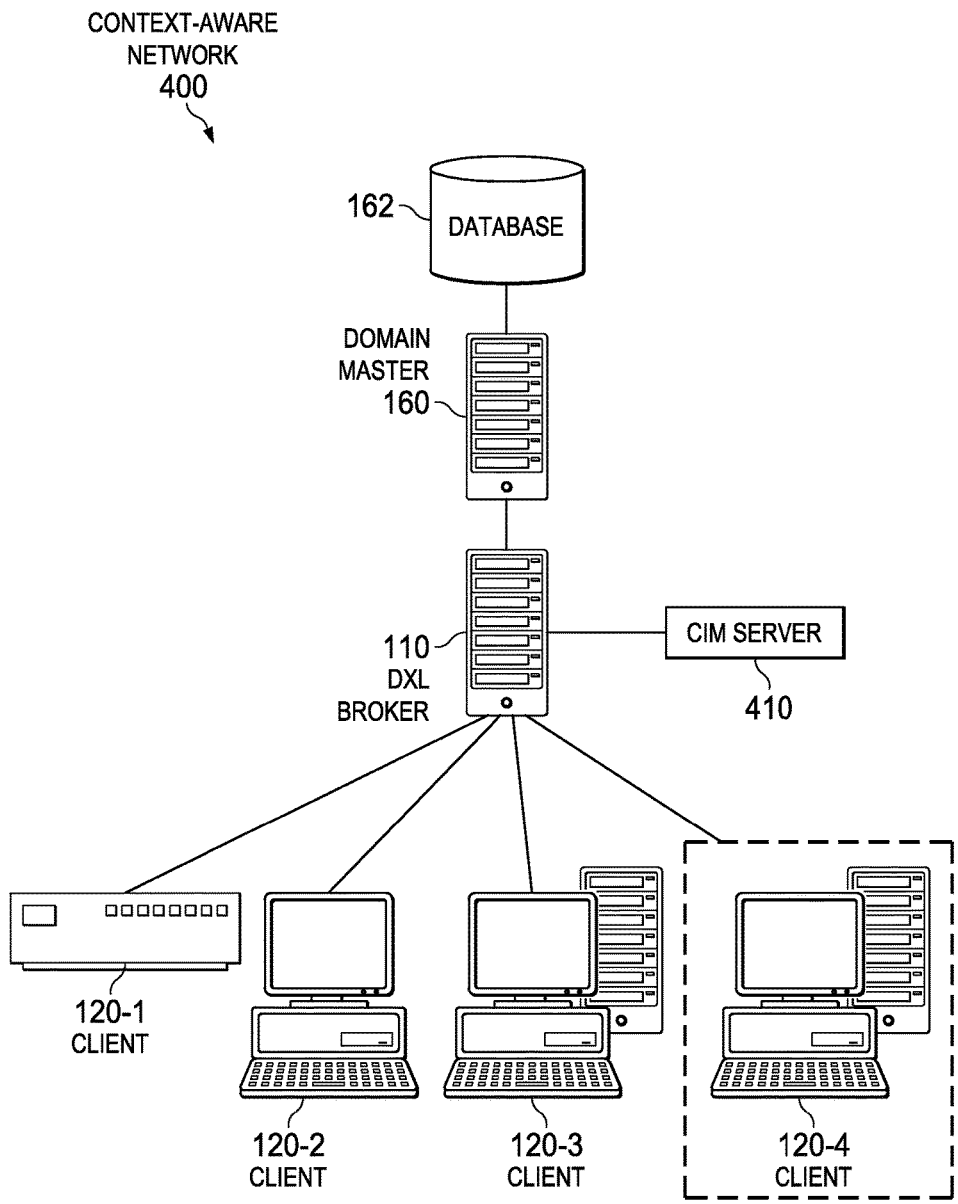
FIG. 4 is a network diagram of a context-aware network according to one or more examples of the present specification.

FIG. 4 is a network diagram of a context-aware network 400 according to one or more examples of the present specification. In an example, context-aware network 400 is substantially similar to context-aware network 100. However, in context-aware network 400, domain master 160 is a common information model (CIM) server 410.

According to one or more examples of the present specification, CIM is an open and extensible logical database schema designed to host different types of situational and environmental information. CIM may provide robust representation of new objects, building blocks, and data types. Core entities of CIM include, by way of non-limiting example, assets, identities, applications, and locations.

CIM may provide many-to-many relationships and building blocks that drive multiple use cases. CIM may also support advanced data visualization. Advantageously, according to one or more examples of the present specification, CIM scales massively and is open and extensible, allowing different product groups and third parties to develop new data extensions.

In an example of a CIM use case, a "location" represents a collection of network elements forming a logical location mapped into a physical location or a place. The location context can be used to, by way of non-limiting example, gather complete understanding with regards to the true scope and size of an organization (i.e. in the form of a network topology map).

CIM may also maintain the global authoritative state of situational and environmental information by synthesizing contextual information shared by multiple data sources over DXL ESB 130.

Figure 5:
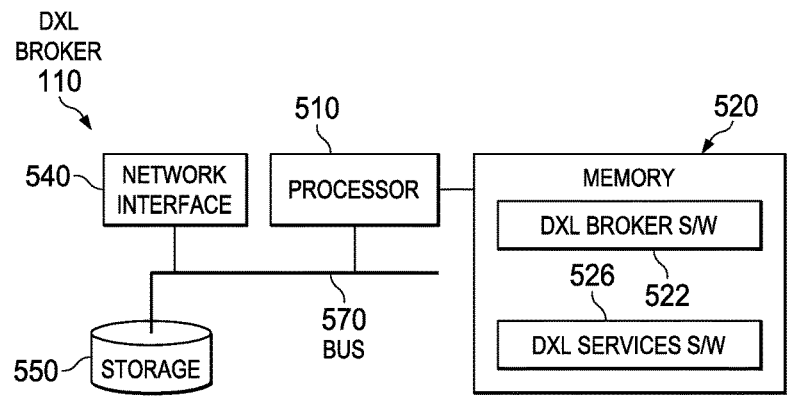
FIG. 5 is a block diagram of a data exchange layer (DXL) broker according to one or more examples of the present specification.

FIG. 5 is a block diagram of a DXL broker according to one or more examples of the present specification. In some embodiments, DXL broker 110, DXL services 190, and JTI server 150 may be provided in a single physical computing device.

In an example, DXL broker 110 is controlled by a processor 510. Processor 510 may connect to other system elements via system bus 570. Those other elements may include, by way of non-limiting example, a memory 520, network interface 540, and storage 550.

Processor 510 is configured to control DXL broker 110, for example via executable software or firmware instructions. A "processor" as used herein includes any combination of hardware, software, or firmware providing programmable logic, including by way of non-limiting example a microprocessor, digital signal processor, field-programmable gate array, programmable logic array, application-specific integrated circuit, or virtual machine processor.

Memory 520 may be a relatively low-latency volatile memory in some embodiments, and may include main memory, cache, on-chip memory, L1 memory, L2 memory, or similar. Note that in this embodiment, processor 510 is depicted in a direct memory access arrangement with memory 520, but in other embodiments, memory 520 may communicate with processor 510 via system bus 570, via some other bus, or via some other means. Furthermore, although memory 520 and storage 550 are depicted in this example as physically or conceptually separate devices, it should be appreciated that in some embodiments, memory 520 and storage 550 may share a physical device, which may or may not be divided into separate memory areas. Thus, it should be appreciated that the arrangement disclosed here is an example only, and not limiting. Rather, it is expressly intended that even where a memory and storage are spoken of separately, they may be embodied in a single physical or logical device unless expressly stated otherwise.

In this example, network interface 540 provides a physical and logical interface to DXL ESB 130, and includes any communication medium, whether analog, digital, or mixed-signal, that is configured to communicatively couple client 120 to other computing devices. Network interface 540 may include, by way of non-limiting example, a WiFi, Ethernet, Firewire, fiber optic, USB, serial interface, infrared, cellular network, digital PCS network, 2G data network, 3G data network, 4G WiMAX, or 4G LTE data network. In some embodiments, network interface 540 may also provide a physical and logical interface to IP Network 310.

Storage 550 is disclosed as an example of a non-volatile memory medium, which may be a species of memory 520. In some embodiments, memory 520 and storage 550 may be separate devices, with memory 520 being a relatively low-latency volatile memory device, and storage 550 being a relatively high-latency non-volatile memory device. Storage 550 may also be another device, such as a hard drive, solid-state drive, external storage, redundant array of independent disks (RAID), network-attached storage, optical storage, tape drive, backup system, or any combination of the foregoing. Many other configurations are also possible, and are intended to be encompassed within the broad scope of this specification.

In an example, memory 520 includes DXL broker 522 and DXL services software 526. DXL broker 522 provides DXL broker services as described herein. DXL services software 526 may provide DXL client services or DXL broker 110. For example, DXL broker 110 may subscribe to certain types of messages in a client capacity.

Figure 6:
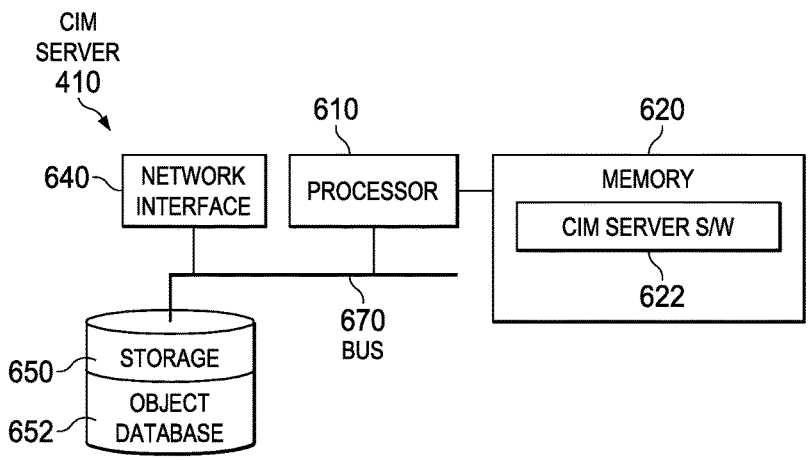
FIG. 6 is a block diagram of a common information model (CIM) server according to one or more examples of the present specification.

FIG. 6 is a block diagram of a CIM server 410 according to one or more examples of the present specification. In an example, CIM server 410 is controlled by a processor 610. Processor 610 may connect to other system elements via system bus 670. Those other elements may include, by way of non-limiting example, a memory 620, network interface 640, and storage 650. Reference is made to corresponding elements in FIG. 5, which contains additional details and definitions.

Memory 620 may include CIM server software 622. CIM server software 622 may be configured to provide CIM services as described herein.

Storage 650 may include a local object database 652. Object database 652 may contain stored information about objects on the network, including, for example, reputations and metadata.

Figure 7:
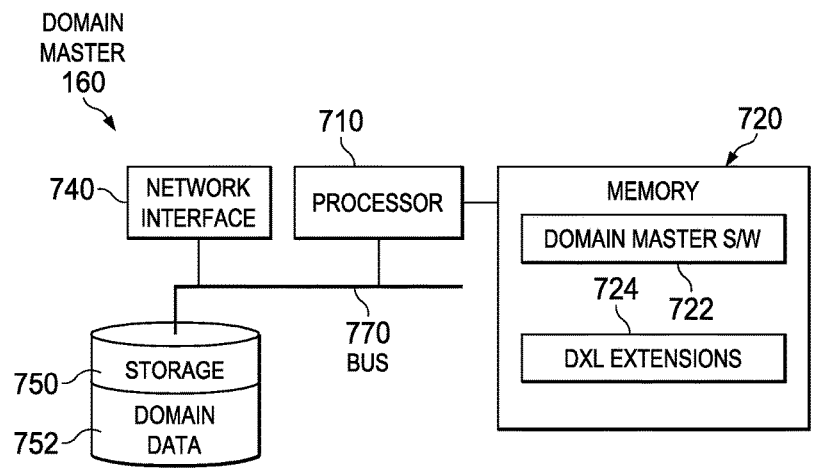
FIG. 7 is a block diagram of a domain master according to one or more examples of the present specification.

FIG. 7 is a block diagram of a domain master 160 according to one or more examples of the present specification. In an example, domain master 160 is controlled by a processor 710. Processor 710 may connect to other system elements via system bus 770. Those other elements may include, by way of non-limiting example, a memory 720, network interface 740, and storage 750. Reference is made to corresponding elements in FIG. 5, which contains additional details and definitions.

In an example, memory 720 includes domain master software 722 and DXL extension 724. Domain master software 722 may be configured to provide domain master services as described herein. DXL extensions 724 may provide server extensions that allow domain master 160 to operate on DXL ESB 130. In some embodiments, DXL extension 724 may include instructions that permit domain master 160 to act as a DXL client in some situations.

Figure 8:
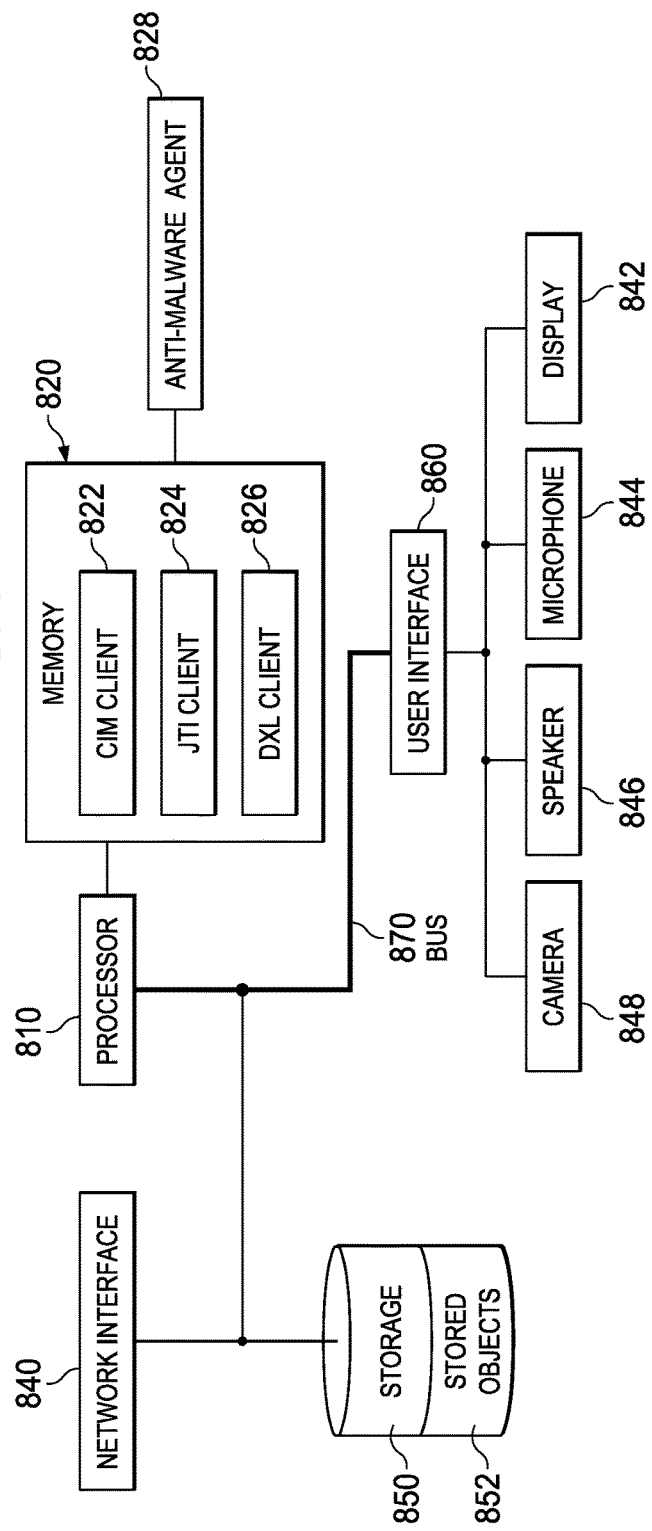
FIG. 8 is a block diagram of a client according to one or more examples of the present specification.

FIG. 8 is a block diagram of a client 120 according to one or more examples of the present specification. Client 120 is controlled by a processor 810, which is communicatively coupled to a memory element 820. In an example, processor 810 is communicatively coupled to other system elements via bus 870. Those elements may include, by way of non-limiting example, a network interface 840, storage 850, which in some cases may be a species of memory element 820, and a user interface 860. It is expressly intended that any of the above elements can be realized in hardware, software, firmware, or any combination thereof.

In some embodiments, a user interface 860 may be provided to aid a user in interacting with client 120. A "user interface" includes any combination of hardware, software, and firmware configured to enable a user to interact with client 120, whether or not in real-time. In the example, user interface 360 may include, by way of non-limiting example, a keyboard (not shown), mouse (not shown), display monitor 842, speaker 846, microphone 844, touch-sensitive display, which may act as a combined input/output device, and which may be a species of display 842, and a camera 848. User interface 860 may include software services such as a graphical user interface, including real-time dialog boxes that solicit input or confirmation from a user.

In an example, memory 820 has stored therein executable instructions operable to provide software services, which may be contained in several distinct modules. A DXL client 826 may provide software services for interacting with DXL ESB 130, and may include, for example, certificates authenticating client 120 on DXL ESB 130, subroutines for publishing messages, and subroutines for parsing subscribed incoming messages. CIM client 822 may provide CIM services as described with more particularity in relation to FIG. 4. CIM client 822 may also maintain a comprehensive catalog of stored objects 852, including for example a comprehensive catalog of installed applications. JTI client 824 may provide JTI client services, such as local reputation management and interactions with JTI server 150. Client 120 may also have a separate antimalware agent 828, which may provide antivirus and other antimalware services. In some cases, antimalware agent 828 is integrated with JTI client 824.

Figure 9:
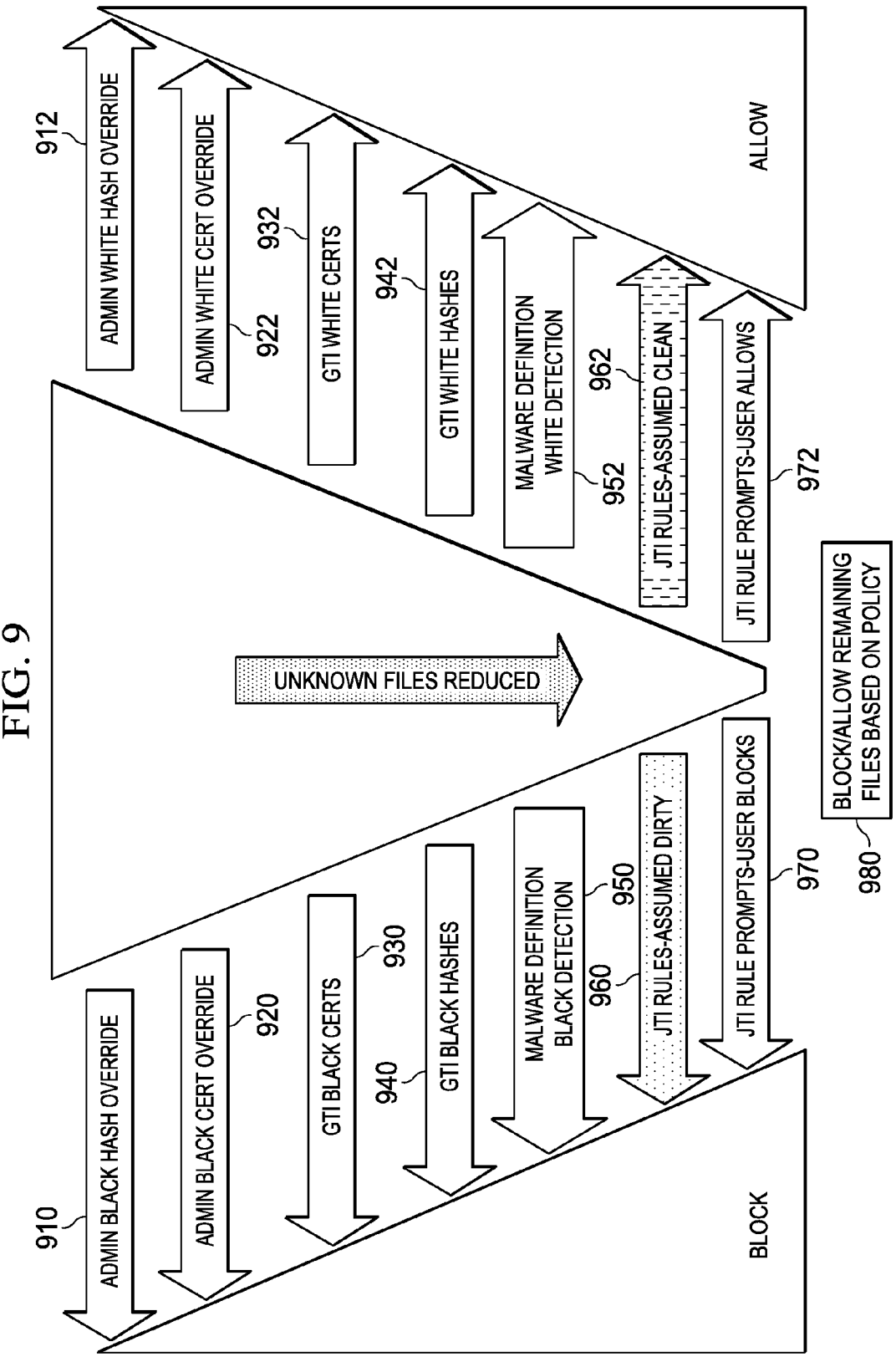
FIG. 9 is a flow diagram illustrating evaluation of an object in a hierarchical manner according to one or more examples of the present specification.

FIG. 9 is a flow diagram illustrating evaluation of an object in a hierarchical manner according to one or more examples of the present specification.

In this example, policies on the left are designated as "black," and deterministically block an object, while policies on the right are designated as "white," and deterministically allow an object. By way of non-limiting example, the policies of FIG. 9 are disclosed as a fixed hierarchy. However, this is not intended to be limiting. For example, in other embodiments, policies may be weighted, or serviced in a round-robin fashion. Furthermore, in embodiments where a hierarchy is used, this particular hierarchy is not required.

In block 910, an administrator, which may be either or both of a human operator or a device with administrative credentials, may assign a "black" override to the object, which may be identified by a hash. In block 912, the administrator may provide a "white" override to an object identified by a hash.

In block 920, an administrator may assign a black overwrite to an object identified by a certificate. In block 922, an administrator may assign a white overwrite to an object identified by a certificate.

In block 930, threat intelligence service 180 may assign a black status based on a certificate. In block 932, threat intelligence service 180 may assign an object white status based on a certificate.

In block 940, threat intelligence service 180 may assign an object black status based on a hash. In block 942, threat intelligence service 180 may assign an object white status based on a hash.

In block 950, malware definitions may identify an object as black, while in block 952, malware definitions may identify the object as white.

In block 960, JTI rules may assume that the object is dirty. In block 962, JTI rules may assume that the object is clean.

JTI client 824 may prompt an end user, via user interface 860, to confirm executing or opening an object. If the user declines, then in block 970 the object is blocked. If the user confirms, then in block 972 the object is allowed.

In block 980, if the object has passed all the preceding filters, a decision to either block or allow the object depends on JTI policies and algorithms. This may include requesting a reputation for the object.

Figure 10:
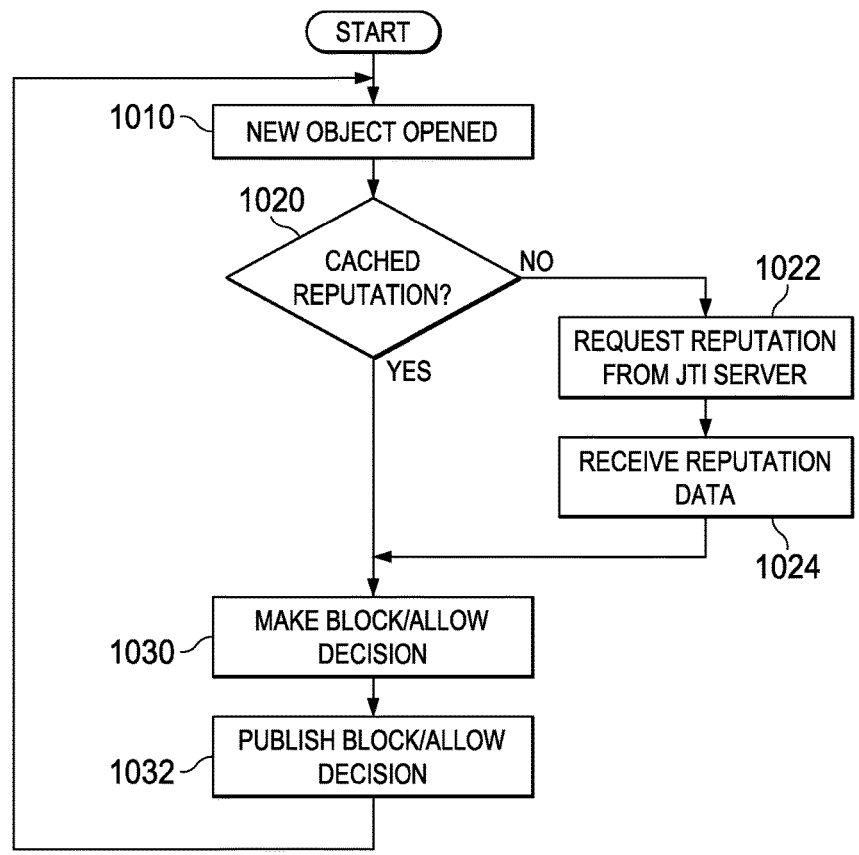
FIG. 10 is a flow diagram of a method performed by a client according to one or more examples of the present specification.

FIG. 10 is a flow diagram of a method performed by a client 120 according to one or more examples of the present specification. In block 1010, client 120 opens a new object. This may be, for example, because a user interacts with the object, or because an automated process interacts with the object. In block 1020, client 120 checks to see if the object has a cache reputation in its local reputation database. If the object has an existing reputation, then in block 1030, client 120 may make a decision to either block or allow the object. In some examples, client 120 may publish the block or allowed decision over DXL ESB 130. This allows other DXL network objects that have subscribed to such updates to receive and integrate the decision. In block 1022, if there is no cache reputation, then client 120 may request a reputation from JTI server 150. In block 1024, client 120 may receive a reputation data from JTI server 150, whereupon control passes to block 130. As shown by the looping arrow back to 1010, this process may be repeated for each new object.

Figure 10A:
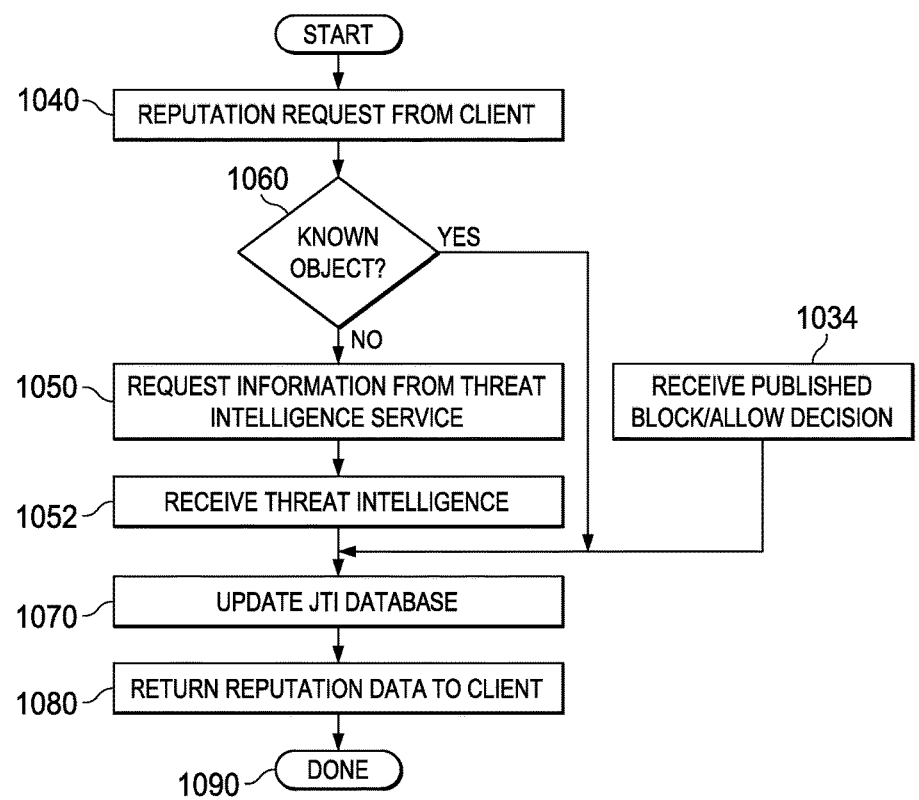
FIG. 10A is a flow diagram of a method performed by a JTI server in connection with the method of FIG. 10 according to one or more example embodiments of the present specification.

FIG. 10A is a flow diagram of a method performed by JTI server 150 in connection with the method of FIG. 10 according to one or more example embodiments of the present specification. In block 1040, JTI server 150 receives a reputation request from client 120. In block 1060, JTI server 150 may query its local database to find whether the object is already known. If the object is known, then in block 1070, JTI server 150 may update its local threat intelligence database. This may include, for example, noting the circumstances of the request from client 120. In block 1080, JTI server 150 may return the reputation data to client 120. In block 1090, the method is complete.

Returning to block 1060, if the object is not known, then in block 1050 JTI server 150 may request information from the threat intelligence service 180. In block 1052, JTI server 150 receives threat intelligence data from threat intelligence service 180, and in block 1070 updates its local JTI database with the received intelligence. Again in block 1080, the intelligence is returned to client 120, and in block 1090 the process is done.

Block 1034 represents an alternate entry point into the method. At block 1034, a JTI server 150 receives a published decision, for example a decision to be published by client 120 according to the method of FIG. 10. Depending on the network configuration, JTI server 150 may subscribe to published block/allow decisions, and in block 1070 may use a published decision to update its local database. In this case, control passes directly from block 1080 to block 1090.

Figure 11:
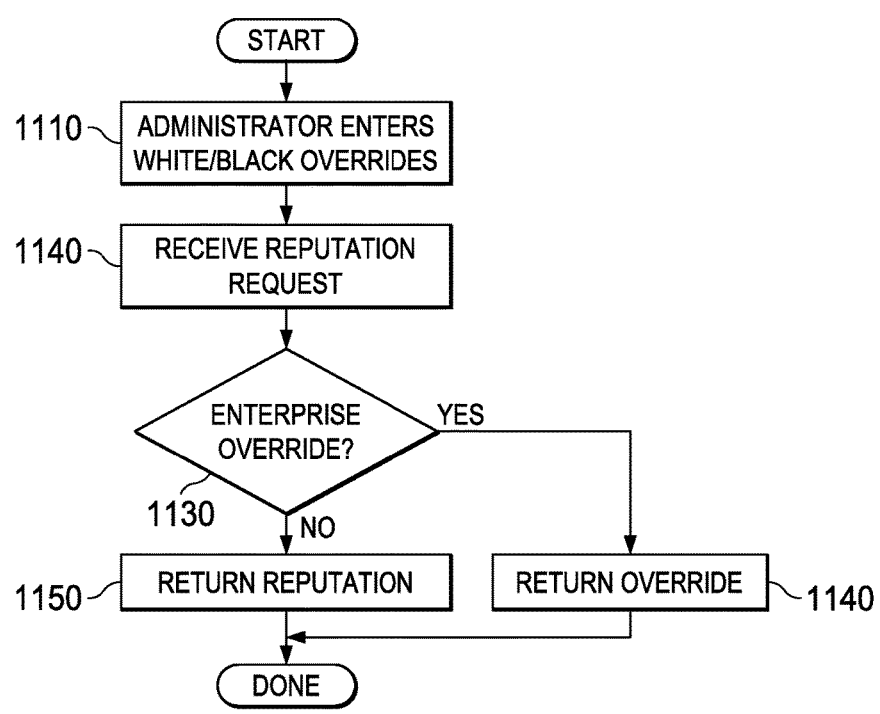
FIG. 11 is a flow diagram of a method of a JTI server servicing a reputation request according to one or more examples of the present specification.

FIG. 11 is a flow diagram of a method of a JTI server 150 servicing a reputation request according to one or more examples of the present specification. In some embodiments, the method of FIG. 11 may be performed in connection with block 1080 of FIG. 10A. In block 1110, an administrator may enter white or black overrides, for example as disclosed in connection with FIG. 9. Block 1040 corresponds to block 1040 of FIG. 10A, in which the JTI server 150 receives a reputation request from client 120. In block 1130, JTI server 150 checks to see whether the administrator has entered an override, such as an enterprise-wide override. In particular, an override may remove the decision of whether to allow or block the object. Instead, the override may deterministically allow or block the object. Thus, in block 1140, JTI server 150 returns the override to client 120. In block 1130, if there is no enterprise override, then in block 1150, JTI server 150 returns the reputation for client 120 to act on.

Figure 12:
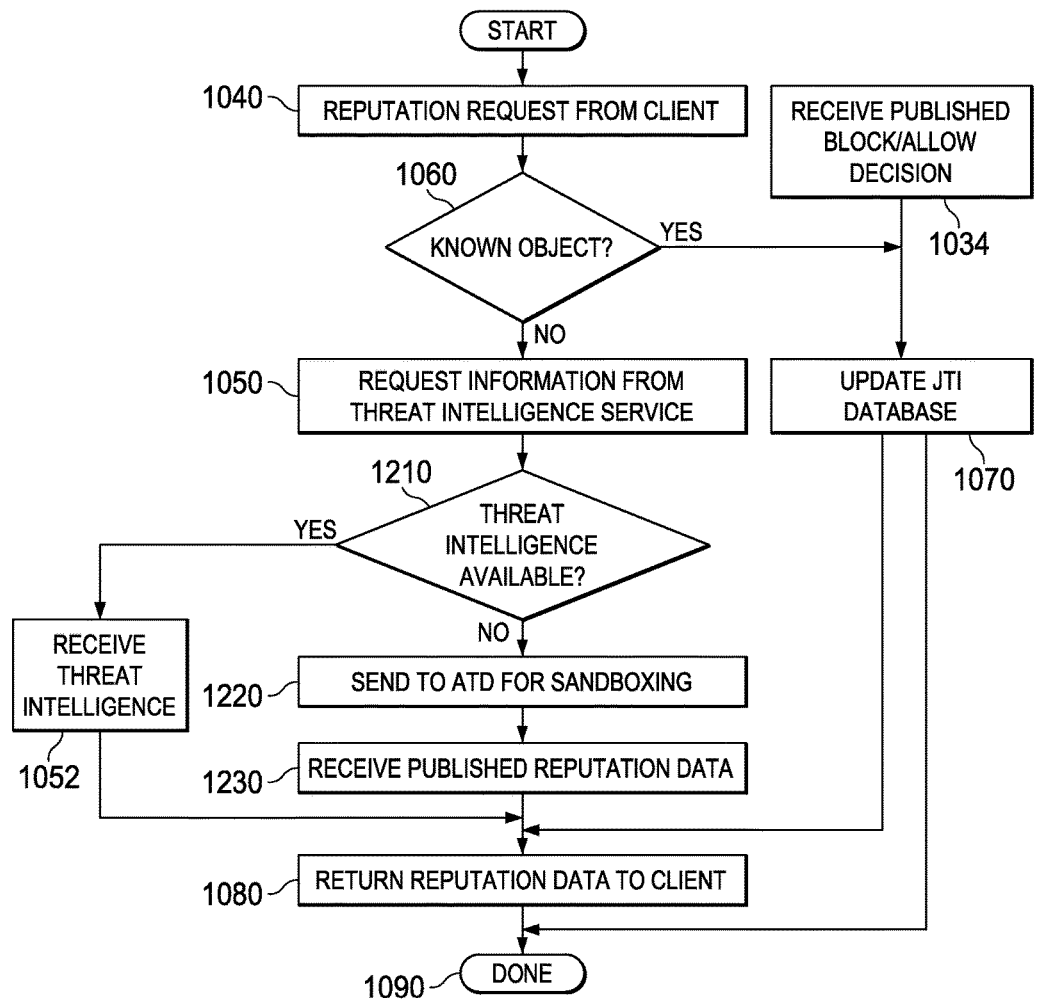
FIG. 12 is a flow diagram of an enhancement to the method of FIG. 10A according to one or more examples of the present specification.

FIG. 12 is a flow diagram of an enhancement to the method of FIG. 10A according to one or more examples of the present specification. Blocks in FIG. 12 with numbering identical to the blocks in FIG. 10A may be identical to the functions of blocks disclosed in FIG. 10A.

New block 1210 queries whether threat intelligence is available from threat intelligence service 180. If threat intelligence is available, then in block 1052, JTI server 150 receives the threat intelligence as with FIG. 10A. In block 1220, if no threat intelligence is available, then JTI server 150 may send the object to ATD 370 for analysis. Rather than respond directly to the request, ATD 370 may publish reputation data for the object once it has completed its analysis. In block 1230, JTI server 150 may subscribe to published reputation data messages, and thus may receive the DXL message published by ATD 370. The remainder of the method may be unchanged.

In an example, a domain master 160 may be configured to assign reputations to objects based on network prevalence.

Figure 13:
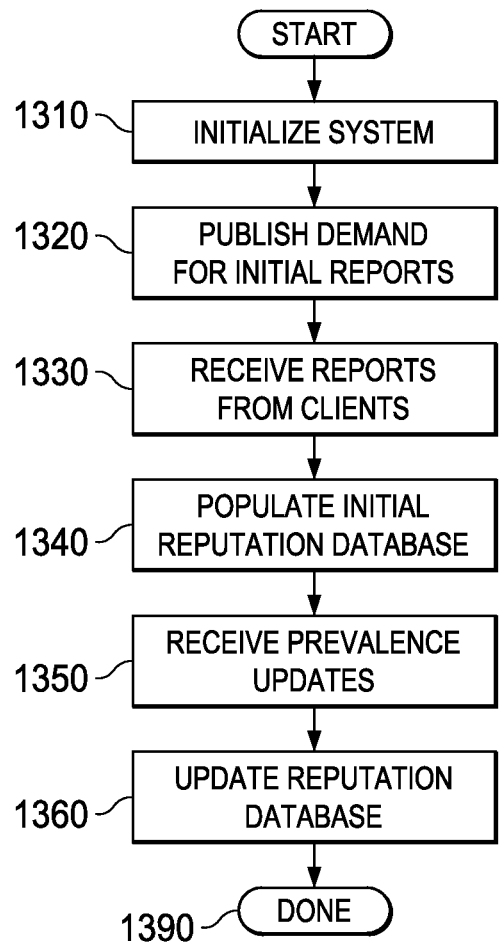
FIG. 13 is a flowchart of method of a domain master initializing and maintaining a prevalence-based reputation database according to one or more examples of the present specification.

FIG. 13 is a flowchart of a method of a domain master 160 initializing and maintaining a prevalence-based reputation database according to one or more examples of the present specification. In block 1310, domain master 160 initializes the system. This may include, for example, setting up databases, establishing data structures, and otherwise initializing services to prepare domain master 160 to operate in a DXL domain. In block 1320, domain master 160 publishes a demand for initial reports from clients 120. For example, clients 120 may have CIM services running, and may catalog local objects. Responsive to the demand for initial reports, clients 120 may either publish object reports, or send a DXL response to domain master 160. In block 1330, domain master 160 receives reports from clients 120. In block 1340, domain master 160 populates an initial reputation database, for example with data received from clients 120.

In some embodiments, block 1350 represents a maintenance procedure. In block 1350, domain master 160 receives prevalence updates from clients 120. In block 1360, domain master 160 updates its prevalence-based reputation database with the updated information. In block 1390, the process is done.

Figure 14:
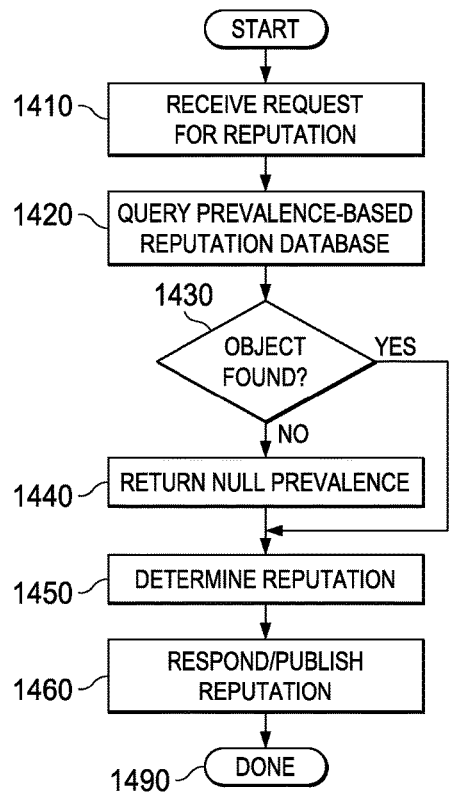
FIG. 14 is a block diagram of a method performed by a domain master in response to receiving a reputation request, according to one or more examples of the present specification.

FIG. 14 is a block diagram of a method performed by domain master 160, in response to receiving a reputation request, according to one or more examples of the present specification. In block 1410, domain master 160 receives a reputation request from a client 120. In block 1420, domain master 160 queries its prevalence-based reputation database to determine whether the object has an existing reputation in the database. In block 1430, if the object is not found, then in block 1440, domain master 160 may return a null prevalence. Note that a null prevalence need not necessarily correspond to a specific reputation. In some embodiments, it may simply represent that the object has no established presence on the network. However, in some embodiments, a null reputation may indicate a relatively low reputation. In block 1450, domain master 160 determines a reputation for the object. Determining reputation may include computing a reputation, or it may include looking at a previously determined reputation based on the prevalence. Note that in some embodiments, calculating a reputation based on prevalence may take place offline, or may be performed by a different device, such as threat intelligence service 180 for example. In block 1460, domain master 160 publishes the determined reputation. In block 1490, the process is done.

Figure 15:
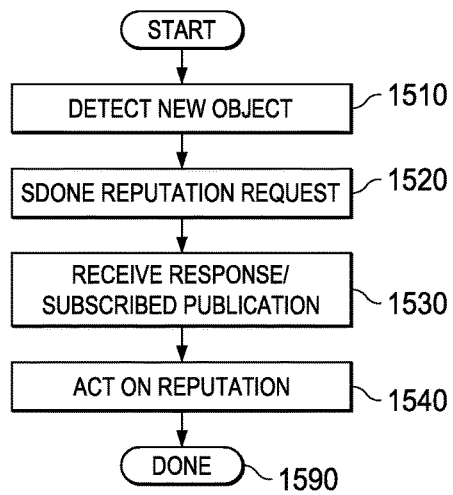
FIG. 15 is a flowchart of a method performed by a client according to one or more examples of the present specification.

FIG. 15 is a flowchart of a method performed by a client 120 according to one or more examples of the present specification. Note that a client 120 is disclosed by way of example only, and the method of FIG. 15 may be performed by any suitable DXL endpoint.

In block 1510, client 120 detects a new object. In block 1520, client 120 sends a reputation request to domain master 160. This may be a request-response type message on DXL ESB 130. In other embodiments, this may be a published message on DXL ESB 130. In block 1530, client 120 either receives a response from domain master 160, or receives a published message on a topic that client 120 has subscribed to. This may be the case, for example, where domain master 160 publishes reputation data rather than sending a direct response to client 120. In block 1540, client 120 may act on the reputation. An action taken in response to the reputation may depend on a threat classification for the object, and may include, by way of non-limiting example, quarantine, block, delete, sandbox, deny permissions (e.g., if the object is identified as grayware), remedy, prompt, or take a custom action. In block 1590, the process is done.

It should be noted that in some examples, an object's prevalence may be only one of a plurality of factors that are considered in a reputation calculation. Other factors may include, by way of non-limiting example, certificates, results of advanced threat detection, observed behavior, threat intelligence data, and local analysis.

Example Embodiment Implementations

There is disclosed in example 1, one or more non-transitory computer-readable medians having stored thereon software instructions for providing a data exchange later (DXL) domain master, the instructions operable to instruct a processor to:
  receive a reputation request for an object;
  query a prevalence-based reputation database;
  receive a prevalence for the object; and
  respond to the reputation request by returning a prevalence-based reputation for the object.

There is disclosed in example 2, the computer-readable medium of example 1, wherein the instructions operable to query a prevalence-based reputation database are further operable to determine whether the object has an existing prevalence, and upon determining that the object does not have an existing prevalence, return a null prevalence.

There is disclosed in example 3, the computer-readable medium of example 1 or 2, wherein the null prevalence corresponds to a low reputation.

There is disclosed in example 4, the computer-readable medium of any of examples 1-3, wherein the instructions operable to respond to the reputation request are further operable to calculate a reputation based on the prevalence for the object.

There is disclosed in example 5, the computer-readable medium of any of examples 1-4, wherein the instructions operable to respond to the reputation request are further operable to query an existing reputation based on the prevalence for the object.

There is disclosed in example 6, the computer-readable medium of any of examples 1-5, wherein the instructions are further operable to initialize the prevalence-based reputation database by sending to a plurality of endpoints a demand for initial reports.

There is disclosed in example 7, the computer-readable medium of any of examples 1-6, wherein the instructions are further operable to receive prevalence updates from a plurality of clients, and to update the prevalence-based reputation database based on the prevalence updates.

There is disclosed in example 8, a data exchange layer (DXL) domain master comprising:
  a processor;
  a network interface configured to communicatively couple the processor to a DXL enterprise service bus; and
  a memory having stored thereon executable instructions operable to instruct the processor to:
    receive a reputation request for an object;
    query a prevalence-based reputation database;
    receive a prevalence for the object; and
    respond to the reputation request by returning a prevalence-based reputation for the object.

There is disclosed in example 9, the DXL domain master of example 8, wherein the instructions operable to query a prevalence-based reputation database are further operable to determine whether the object has an existing prevalence, and upon determining that the object does not have an existing prevalence, return a null prevalence.

There is disclosed in example 10, the DXL domain master of example 8 or 9, wherein the null prevalence corresponds to a low reputation.

There is disclosed in example 11, the DXL domain master of any of examples 8-10, wherein the instructions operable to respond to the reputation request are further operable to calculate a reputation based on the prevalence for the object.

There is disclosed in example 12, the DXL domain master of any of examples 8-11, wherein the instructions operable to respond to the reputation request are further operable to query an existing reputation based on the prevalence for the object.

There is disclosed in example 13, the DXL domain master of any of examples 8-12, wherein the instructions are further operable to initialize the prevalence-based reputation database by sending to a plurality of endpoints a demand for initial reports.

There is disclosed in example 14, the DXL domain master of any of examples 8-13, wherein the instructions are further operable to receive prevalence updates from a plurality of clients, and to update the prevalence-based reputation database based on the prevalence updates.

There is disclosed in example 15, a method of providing data exchange layer (DXL) domain master services on a DXL enterprise service bus, comprising receiving:
  receiving a reputation request for an object;
  querying a prevalence-based reputation database;
  receiving a prevalence for the object; and
  responding to the reputation request by returning a prevalence-based reputation for the object.

There is disclosed in example 16, the method of example 15, wherein querying the prevalence-based reputation database further comprises determining whether the object has an existing prevalence, and upon determining that the object does not have an existing prevalence, return a null prevalence.

There is disclosed in example 17, the method of example 15 or 16, wherein the null prevalence corresponds to a low reputation.

There is disclosed in example 18, the method of any of examples 15-17, wherein responding to the reputation request further comprises calculating a reputation based on the prevalence for the object.

There is disclosed in example 19, the method of any of examples 15-18, wherein responding to the reputation request further comprises querying an existing reputation based on the prevalence for the object.

There is disclosed in example 20, the method of any of examples 15-19, further comprising initializing the prevalence-based reputation database by sending to a plurality of endpoints a demand for initial reports.

There is disclosed in example 21, the method of any of examples 15-20, further comprising receiving prevalence updates from a plurality of clients, and to update the prevalence-based reputation database based on the prevalence updates.

What is claimed is:

1. One or more tangible, non-transitory computer-readable mediums having stored thereon software instructions for providing a data exchange layer (DXL) domain master, the instructions operable to instruct a processor to:
  communicatively couple to a DXL via a DXL broker configured to natively provide a brokered request-response (1:1) framework on a publish-subscribe (1:N) fabric by maintaining a message queuing telemetry transport (MQTT) DXL routing table of DXL endpoints registered to the DXL broker;
  provide DXL messaging services to a plurality of DXL endpoints via the DXL, including providing control of a data domain comprising reconciling multiple conflicting inputs into a single record of truth;
  store the record of truth in a domain database;
  receive from a DXL endpoint a request for a reputation for an object via the DXL;
  query the domain database for a record of truth comprising a prevalence for the object; and
  respond to the reputation request by publishing via the DXL a DXL response comprising a prevalence-based reputation for the object.

2. The one or more tangible, non-transitory computer-readable mediums of claim 1, wherein the instructions operable to query the domain database for a record of truth are further operable to determine whether the object has an existing prevalence, and upon determining that the object does not have an existing prevalence, return a null prevalence.

3. The one or more tangible, non-transitory computer-readable mediums of claim 2, wherein the null prevalence corresponds to a low reputation.

4. The one or more tangible, non-transitory computer-readable mediums of claim 1, wherein the instructions operable to respond to the reputation request are further operable to calculate a reputation based on the prevalence for the object.

5. The one or more tangible, non-transitory computer-readable mediums of claim 1, wherein the instructions operable to respond to the reputation request are further operable to query an existing reputation based on the prevalence for the object.

6. The one or more tangible, non-transitory computer-readable mediums of claim 1, wherein the instructions are further operable to initialize the domain database for a record of truth by sending to the plurality of DXL endpoints a demand for initial reports.

7. The one or more tangible, non-transitory computer-readable mediums of claim 1, wherein the instructions are further operable to receive prevalence updates from a plurality of clients, and to update the domain database for a record of truth based on the prevalence updates.

8. A data exchange layer (DXL) domain master comprising:
  a processor;
  a network interface; and
  a memory having stored thereon executable instructions operable to instruct the processor to:
  communicatively couple to a DXL via a DXL broker configured to natively provide a brokered request-response (1:1) framework on a publish-subscribe (1:N) fabric by maintaining a message queuing telemetry transport (MQTT) DXL routing table of DXL endpoints registered to the DXL broker;
  provide DXL messaging services to a plurality of DXL endpoints via the DXL,
    including providing control of a data domain comprising reconciling multiple conflicting inputs into a single record of truth, and storing the record of truth in a domain database; and
  receive from a DXL endpoint a request for a reputation for an object via the DXL;
  query the domain database for a record of truth comprising a prevalence for the object; and
  respond to the reputation request by publishing via the DXL a DXL response comprising a prevalence-based reputation for the object.

9. The DXL domain master of claim 8, wherein the instructions operable to query the domain database for a record of truth are further operable to determine whether the object has an existing prevalence, and upon determining that the object does not have an existing prevalence, return a null prevalence.

10. The DXL domain master of claim 9, wherein the null prevalence corresponds to a low reputation.

11. The DXL domain master of claim 8, wherein the instructions operable to respond to the reputation request are further operable to calculate a reputation based on the prevalence for the object.

12. The DXL domain master of claim 8, wherein the instructions operable to respond to the reputation request are further operable to query an existing reputation based on the prevalence for the object.

13. The DXL domain master of claim 8, wherein the instructions are further operable to initialize the domain database for a record of truth by sending to the plurality of DXL endpoints a demand for initial reports.

14. The DXL domain master of claim 8, wherein the instructions are further operable to receive prevalence updates from a plurality of clients, and to update the domain database for a record of truth based on the prevalence updates.

15. A method of providing data exchange layer (DXL) domain master services on a DXL enterprise service bus, comprising:
communicatively coupling to a DXL via a DXL broker configured to natively provide a brokered request-response (1:1) framework on a publish-subscribe (1:N) fabric by maintaining a message queuing telemetry transport (MQTT) DXL routing table of DXL endpoints registered to the DXL broker;
providing DXL messaging services to a plurality of DXL endpoints via the DXL, including providing control of a data domain comprising reconciling multiple conflicting inputs into a single record of truth;
storing the record of truth in a domain database;
receiving from a DXL endpoint a request for a reputation for an object via the DXL;
querying the domain database for a record of truth comprising a prevalence for the object; and
responding to the reputation request by publishing via the DXL a DXL response comprising a prevalence-based reputation for the object.

16. The method of claim 15, wherein querying the domain database for a record of truth further comprises determining whether the object has an existing prevalence, and upon determining that the object does not have an existing prevalence, returning a null prevalence.

17. The method of claim 16, wherein the null prevalence corresponds to a low reputation.

18. The method of claim 15, wherein responding to the reputation request further comprises calculating a reputation based on the prevalence for the object.

19. The method of claim 15, wherein responding to the reputation request further comprises querying an existing reputation based on the prevalence for the object.

20. The method of claim 15, further comprising initializing the domain database for a record of truth by sending to the plurality of DXL endpoints a demand for initial reports.

21. The method of claim 15, further comprising receiving prevalence updates from a plurality of clients, and to update the domain database for a record of truth based on the prevalence updates.

* * * * *

UNITED STATES PATENT AND TRADEMARK OFFICE
CERTIFICATE OF CORRECTION

PATENT NO. : 10,237,303 B2
APPLICATION NO. : 14/913437
DATED : March 19, 2019
INVENTOR(S) : Kenneth D. Simone et al.

Page 1 of 1

It is certified that error appears in the above-identified patent and that said Letters Patent is hereby corrected as shown below:

On the Title Page

Column 1, item (71) Applicant, Delete "Plano, TX" and insert -- Santa Clara, CA --, therefor.

Column 1, item (72) Inventors, Delete "Allex," and insert -- Allen, --, therefor.

In the Specification

Column 1, Line 6, Delete "claims" and insert -- is a national stage application under 35 U.S.C. §371 of PCT International Application PCT/US2013/077149, filed on Dec. 20, 2013 and entitled "Prevalence-Based Reputations" which application claims the benefit of --, therefor.

Column 1, Line 8, Delete "2013, which is incorporated herein by reference." and insert -- 2013. The disclosures of the prior applications are considered part of and are hereby incorporated by reference in their entirety in the disclosure of this application --, therefor.

Signed and Sealed this
Eighteenth Day of June, 2019

Andrei Iancu
*Director of the United States Patent and Trademark Office*